United States Patent
Wechs

(10) Patent No.: US 7,201,860 B2
(45) Date of Patent: Apr. 10, 2007

(54) POLYAMIDE MEMBRANE WITH IMPROVED HYDROLYTIC STABILITY AND METHOD FOR PRODUCTION THEREOF

(75) Inventor: Friedbert Wechs, Wörth (DE)

(73) Assignee: Membrana GmbH, Wuppertal (DE)

(*) Notice: Subject to any disclaimer, the term of this patent is extended or adjusted under 35 U.S.C. 154(b) by 463 days.

(21) Appl. No.: 10/297,179

(22) PCT Filed: May 23, 2001

(86) PCT No.: PCT/EP01/05918

§ 371 (c)(1),
(2), (4) Date: Dec. 3, 2002

(87) PCT Pub. No.: WO01/93994

PCT Pub. Date: Dec. 13, 2001

(65) Prior Publication Data

US 2003/0159984 A1    Aug. 28, 2003

(30) Foreign Application Priority Data

Jun. 3, 2000  (DE) .............................. 100 27 701

(51) Int. Cl.
B29C 65/00 (2006.01)
B01D 39/00 (2006.01)
B01D 39/14 (2006.01)

(52) U.S. Cl. .............. 264/41; 264/176.1; 264/177.19; 264/178 R; 264/48; 210/500.38; 210/500.27; 210/500.23

(58) Field of Classification Search ........... 210/500.38, 210/500.37, 500.23, 500.27, 500.42, 500.36, 210/490; 264/41, 48, 49, 638, 176.1, 177.19, 264/178 R; 427/244; 521/53; 428/364, 428/373, 374, 474.4, 220, 332; 523/160, 523/195; 95/45–52

See application file for complete search history.

(56) References Cited

U.S. PATENT DOCUMENTS

| | | | | | |
|---|---|---|---|---|---|
| 2,630,421 A | * | 3/1953 | Stamatoff | ..................... | 524/92 |
| 3,285,855 A | * | 11/1966 | Dexter et al. | ................ | 508/476 |
| 3,454,412 A | * | 7/1969 | Stokes | .................... | 106/287.21 |
| 3,477,986 A | * | 11/1969 | Rudolph et al. | ............. | 524/154 |
| 3,644,482 A | * | 2/1972 | Dexter | ......................... | 560/75 |
| 4,247,498 A | * | 1/1981 | Castro | ......................... | 264/41 |
| 4,340,479 A | * | 7/1982 | Pall | ............................. | 210/490 |
| 4,340,480 A | | 7/1982 | Pall et al. | | |
| 4,519,909 A | * | 5/1985 | Castro | ................... | 210/500.27 |
| 4,594,207 A | | 6/1986 | Josefiak et al. | | |
| 4,661,526 A | * | 4/1987 | Ford | ........................... | 521/53 |
| 4,711,793 A | | 12/1987 | Ostreicher et al. | | |
| 4,761,233 A | * | 8/1988 | Linder et al. | .......... | 210/500.37 |
| 5,458,782 A | * | 10/1995 | Hou et al. | ................... | 210/651 |
| 5,593,588 A | * | 1/1997 | Kim et al. | .................. | 210/490 |
| 5,698,101 A | * | 12/1997 | Kopp et al. | ............. | 210/500.23 |
| 6,146,757 A | * | 11/2000 | Mor et al. | ................... | 428/364 |
| 6,706,413 B2 | * | 3/2004 | Böhringer et al. | ........ | 428/474.4 |
| 6,723,759 B2 | * | 4/2004 | Takenaka et al. | .......... | 521/40.5 |
| 6,776,940 B2 | * | 8/2004 | Meyering et al. | .......... | 264/45.9 |
| 6,933,330 B2 | * | 8/2005 | Hidaka et al. | .............. | 523/160 |

* cited by examiner

Primary Examiner—Ana Fortuna
(74) Attorney, Agent, or Firm—Oliff & Berridge, PLC

(57) ABSTRACT

The invention relates to a method for producing a hydrolytically stable polyamide membrane having an open-pored, microporous and sponge-like support-layer structure, using a process involving thermally induced liquid-liquid phase separation. A solution of an aliphatic polyamide in a solvent system, comprising preferably a solvent and a non-solvent for the polyamide, is extruded to form a shaped object. After leaving the die, the shaped object is cooled by means of a cooling medium until phase separation occurs and the polymer-rich phase solidifies to form the membrane structure. The solution of the polyamide in the solvent system contains an antioxidant agent as a stabiliser for the polyamide which, together with the solvent system, is selected in a way that the antioxidant agent is essentially insoluble in the solvent system at the phase separation temperature. The invention also relates to a polyamide membrane with improved hydrolytic stability, characterised in that it contains an antioxidant agent as a stabiliser for improving hydrolytic stability.

10 Claims, No Drawings

POLYAMIDE MEMBRANE WITH IMPROVED HYDROLYTIC STABILITY AND METHOD FOR PRODUCTION THEREOF

BACKGROUND OF THE INVENTION

1. Field of the Invention

The invention relates to a method for producing polyamide membranes with improved hydrolytic stability and to polyamide membranes with improved hydrolytic stability.

2. Description of Related Art

Polyamide membranes are used in membrane technology in many ways, e.g., as ultrafiltration membranes or microfiltration membranes for filtration purposes in such sectors as the food and drink industry or the electronics industry.

A wide variety of methods is available for production of polyamide membranes. The majority of these use wet-spinning processes, i.e., methods in which a solution of a polyamide in a solvent, to which a proportion of non-solvent can also be added, is brought into contact with a non-solvent. The membrane structure is then formed by the ensuing coagulation induced by the non-solvent.

A process of this type is described in, e.g., U.S. Pat. No. 4,340,479, DE-A-30 28 213 and DE-A-31 38 525, where formic acid is used as the solvent and water as the non-solvent or coagulant. U.S. Pat. No. 3,876,738 is based on a similar process and mentions the possibility of interposing a short air evaporation zone between the extrusion of the polymer solution and the coagulation bath, i.e., of using a dry-wet spinning process. A process of this type is described also in DE-A-25 54 922. EP-A-0 413 552 discloses a wet spinning process by means of which asymmetric polyamide membranes with cavern-shaped pores are produced. An alcohol/salt solution is used as the solvent.

Another method for producing microporous polyamide membranes is based on a process involving thermally induced phase separation. In this method, a homogeneous melt solution of the polymer in a solvent system is first prepared at elevated temperatures, wherein the polymer component and the solvent system form a binary system that in the liquid state (of aggregation) has a range in which it exists as a homogeneous solution, and a range in which it possesses a miscibility gap. When such a system is cooled below the demixing temperature, phase separation occurs and a porous polymeric structure is finally formed. Methods of this type in which polyamides, among other compounds, can be used as membrane-forming polymers are described in, e.g., DE-A-32 05 289, EP-A-0 133 882 and EP-A-0 309 136.

However, polyamide membranes produced by these known methods have generally limited suitability for use in applications where they come into contact with aqueous media, particularly at high temperatures and in the presence of oxygen. Degradation of the polyamides occurs in applications of this type. The polyamide membranes therefore have only limited service life in these applications; after some time, as a result of polymer degradation, the mechanical stability of the membrane can no longer be guaranteed and the membranes disintegrate. It must also be noted that the superheated steam sterilisation that is often necessary for the above applications leads to loss of the mechanical stability of the polyamide membranes after only a few sterilisation cycles, rendering the membranes unfit for use.

The need therefore exists for a method of producing polyamide membranes with improved hydrolytic stability, and for such polyamide membranes with improved hydrolytic stability, having a longer service life and higher stability to superheated steam sterilisation as compared with known polyamide membranes and those produced by known methods, for the above-mentioned applications where the membrane is in contact with aqueous media at high temperatures and in the presence of oxygen.

SUMMARY OF THE INVENTION

The object of the invention is achieved by a method for producing a polyamide membrane with improved hydrolytic stability, the method comprising the following steps:

a) preparation of a homogeneous solution of 10–90% by weight of an aliphatic polyamide in 90–10% by weight of a solvent system, where the mixture of polyamide and solvent system has a critical demixing temperature and a solidification temperature, and a miscibility gap below the demixing temperature in the liquid state;

b) forming of the solution into a shaped object in a die having a die temperature above the critical demixing temperature;

c) cooling of the shaped object by means of a cooling medium, which is conditioned to a cooling temperature below the solidification temperature, at such a rate that a thermodynamic non-equilibrium liquid-liquid phase separation into a polymer-rich and a polymer-poor phase results, with subsequent solidification, when the temperature falls below the solidification temperature, of the polymer-rich phase into a membrane structure;

d) removal of the solvent system from the shaped object, characterised in that the solution contains an antioxidant agent as a stabiliser for the polyamide and that the antioxidant agent and solvent system are so chosen that the antioxidant agent is essentially insoluble in the solvent system at the phase separation temperature.

It was surprisingly found that by observing the conditions of the method of the invention polyamide membranes could be produced with longer service life in applications where these membranes are in contact with aqueous media in the presence of oxygen, such as hot water, and/or with improved stability to superheated steam sterilisation. The use of an antioxidant agent in a method for producing a polyamide membrane based on a process with thermally induced phase separation in accordance with the preamble of claim 1 therefore leads to an improvement in the hydrolytic stability of polyamide membranes, provided that the antioxidant agent is essentially insoluble in the solvent system at the phase-separation temperature. Hydrolytic stability of this type has not been previously achieved in polyamide membranes produced by known methods involving thermally induced phase separation.

The object of the invention is further achieved by a polyamide membrane with improved hydrolytic stability based on an aliphatic polyamide, characterised in that it contains in the polyamide an antioxidant agent as a stabiliser to improve hydrolytic stability. Membranes of this type can preferably be produced by the method of the invention. It is surprisingly found that, by using the method of the invention, the presence of the stabiliser used in the process can be guaranteed in the final polyamide membrane. Analysis of the polyamide membranes produced by the method of the invention shows that they contain in their polymer matrix the antioxidant agent used as stabiliser.

Due to the stabiliser contained in the polyamide membranes of the invention or prepared according to the method of the invention, such membranes show hydrolytic stability significantly superior to that of similar polyamide membranes without this stabiliser. In a preferred embodiment, the polyamide membrane of the invention or prepared by the method of the invention shows such an improvement in hydrolytic stability that it possesses a service life in air-saturated water at 80° C. of at least 100 hours, and especially preferably of at least 200 hours, without any loss of mechanical stability. In a further preferred embodiment, the polyamide membrane of the invention, or produced by the method of the invention, shows such improvement in hydrolytic stability that it withstands repeated superheated steam sterilisation at a temperature of at least 125° C. in the presence of atmospheric oxygen over at least 10 cycles, and especially preferably over at least 15 cycles, each of a duration of 1 hour, without any loss of mechanical stability. In another preferred embodiment of the present invention the membrane of the invention, or prepared according to the invention, shows the above-mentioned improved hydrolytic stabilities in combination.

The hydrolytic stability of the polyamide membrane is therefore assessed by means of the service life of the membrane in air-saturated water at 80° C., or by the number of superheated steam sterilisation cycles that can be performed without loss of mechanical stability due to polymer degradation. For the purposes of the present invention, mechanical stability is assumed to exist if the relative solution viscosity SV of the polyamide is $\geq 2$. Loss of mechanical stability is presumed to have occurred, and for the purposes of the present invention to exist, if the SV of the polyamide constituting the membrane falls to values <2. The relative solution viscosity is determined for this purpose in 90% formic acid.

The method of the invention is based on a thermally induced phase separation process with liquid-liquid phase separation. According to the invention, the polymer component and the solvent system together form a binary system, which in the liquid state shows a range where it exists as a homogeneous solution and another in which it has a miscibility gap. If such a system is cooled from the range where it exists as a homogeneous solution to below the critical demixing temperature or phase separation temperature, a liquid-liquid demixing or phase separation into two liquid phases, a polymer-rich and a polymer-poor phase, first occurs. Further cooling to a temperature below the solidification temperature causes the polymer-rich phase to solidify into a three-dimensional membrane structure. The cooling rate, together with the polymer concentration, has an appreciable influence on the pore structure formed. If cooling rate is sufficiently high that the liquid-liquid phase separation cannot occur under thermodynamic equilibrium conditions but under thermodynamic non-equilibrium conditions, but is nevertheless relatively slow, the liquid-liquid phase separation occurs approximately concurrently with the formation of a large number of liquid droplets of essentially the same size. The resulting polymeric structure then has a sponge-like, cellular and open-pored microstructure. If the cooling rate is significantly higher, the polymer solidifies before most of the liquid droplets can develop. Network-like microstructures are then formed. The various types of formation of such sponge-like microporous structures by processes involving thermally induced liquid-liquid phase separation are described in detail in DE-A 27 37 745, to the disclosure of which reference is hereby explicitly made, and presented in, e.g., R. E. Kesting's *Synthetic Polymeric Membranes*, John Wiley & Sons, 1985, pp. 261–264.

DETAILED DESCRIPTION OF PREFERRED EMBODIMENTS

The solvent system used in the method of the invention can consist of one or more solvents for the polyamide. In the context of the present invention, a solvent is understood to be a compound that is a solvent for the polyamide, and in which the polyamide is completely dissolved, on heating to a temperature no higher than the boiling point of this compound, to give a homogeneous solution.

Preferably, however, the solvent system used is a mixture of a compound A and a compound B, where compound A is a solvent for the polyamide and compound B is a non-solvent for the polyamide, a solvent that does dissolve the polyamide, but the dissolving temperature of which relative to the polyamide is at least 50° C., and preferably at least 100° C., higher than the dissolving temperature of compound A relative to the polyamide, or compound B is a swelling agent for the polyamide. A non-solvent is understood here to be a compound that does not dissolve the polyamide to a homogeneous solution in a concentration of 1% by weight in the non-solvent on heating to no higher than the boiling point of this non-solvent.

Addition of compound B to a solution consisting only of compound A and the polyamide changes the behaviour of the polyamide solution on cooling. For solutions consisting of the polyamide and compound A that have no miscibility gap, the addition of compound B causes, according to the invention, a system to be formed that shows a miscibility gap in the liquid state. In solutions consisting of compound A and polyamide that already show a miscibility gap in the liquid state, addition of compound B generally results in an increase in demixing temperature. Depending on the nature of compound B, however, it may occur that addition of compound B in the lower concentration range of compound B leads initially to a lowering of the demixing temperature as the concentration of B increases; further increase in the concentration of compound B then causes a rise in demixing temperature as compared with that of a solution consisting only of compound A and the polymer.

Each combination used of polymer component, compound A and compound B, where compounds A and B together form the solvent system, must be jointly convertible into a single homogeneous liquid phase and must show a critical demixing temperature, below which a phase separation into two liquid phases occurs. The addition of compound B allows selective control of pore size and volume of the porous structure obtained.

Compound A can also be blended with one or more liquids, in particular with other solvents. Compound B can also be used with one or more other compounds, particularly other non-solvents. Compound A in the context of the present invention can therefore be taken to mean not only a single compound but also a mixture of different solvents. Similarly, compound B can also be taken to mean, for example, a mixture of various non-solvents.

The demixing or phase-separation temperature can be determined in a simple way, by initially preparing 20 to 50 g of a homogeneous solution of the polyamide in the solvent or solvent system to be investigated. Care must be taken that the solution is prepared as rapidly as possible and by and large under conditions that minimise degradation of the polyamide. It is advisable to prepare the solution in the absence of air, e.g. in a nitrogen atmosphere. The polyamide solution obtained in this way is then heated to a temperature approx. 20° C. above the dissolving temperature. The solution is then immediately cooled with intensive stirring at the rate of approx. 10° C./min. The demixing temperature or phase-separation temperature is then determined as the temperature at which an initial turbidity can be discerned visually. On further cooling, solidification of the polymer-rich phase occurs when the temperature falls below the solidification temperature.

The proportion of polymer necessary for membrane production and the ratio of compound A to compound B in the solvent system can be determined by preparing phase diagrams by means of simple experiments. Phase diagrams of this type can be derived by known methods, as described by, e.g., C. A. Smolders, J. J. van Aartsen, A. Steenbergen in *Kolloid-Z. und Z. Polymere*, 243 (1971), pp. 14–20. In general, for a given solvent A, the proportion of compound B in the mixture of polymer component, compound A and compound B depends on, e.g., the strength of non-solvent character if a non-solvent is used as compound B. The proportion of compound B in the solvent system is preferably 1 to 45% by weight.

The proportion of polymer in the mixture from which the solution is formed is preferably 10–15% by weight, and the proportion of the solvent system, 90–50% by weight. Especially preferred is a polymer proportion of 10–30% by weight and a proportion of the solvent system of 90–70% by weight. If required, further substances such as nucleation agents, UV absorbers, fillers and even processing auxiliaries like thickeners (to increase viscosity) or similar substances may be added as additives to the polymer component, the solvent system or even the polymer solution.

For a simple execution of the method of the invention, it is desirable that the solvent system used be chemically inert to the polyamide. This means that the solvent system causes essentially no degradation of the polyamide and does not itself react with the polyamide. However, it may be essential, on account of the requirements of the method of the invention and especially on account of the condition that the antioxidant agent be essentially insoluble in the solvent system at the phase separation temperature, to have recourse to a solvent system, or individual components of a solvent system, that are not inert to the polyamide. In these cases, care must be taken, while executing the method of the invention, to keep any changes to the polyamide to the minimum; this is achieved by employing, e.g., short residence times, intensive mixing and/or the lowest possible dissolving temperatures.

The polymer solution, consisting of polymer component and solvent system, is formed by means of suitable dies into a shaped object in order to finally obtain a membrane, preferably in the form of a flat membrane or hollow-fibre membrane. The conventional dies such as sheeting dies, casting moulds, doctor blades, profiled dies, annular-slit dies or hollow-fibre dies can be used for this purpose.

After shaping, the shaped object is cooled using a solid or liquid cooling medium so that a thermodynamic non-equilibrium liquid-liquid phase separation occurs in the shaped object, i.e., in the shaped polymer solution, and the polymer structure subsequently solidifies and hardens. The cooling medium is conditioned here to a temperature below the solidification temperature. In the production of flat membranes, the cooling medium can be a solid substance or a solid surface, e.g., in the form of a glass plate or metal plate, or in the form of an appropriately conditioned or cooled cooling roller on which the shaped object is placed. The solid cooling medium preferably has high thermal conductivity and especially preferably consists of a metallic material. In an advantageous embodiment of the method of the invention, however, the cooling medium used is a liquid.

For a thermodynamic non-equilibrium liquid-liquid phase separation to be initiated, the temperature of the cooling medium must be significantly below the critical demixing temperature or phase-separation temperature of the polymer solution used and should furthermore lie below the solidification temperature for solidification of the polymer-rich phase to occur. The cooling medium should preferably be at a temperature at least 50° C. below the phase separation temperature, and especially preferably at a temperature at least 100° C. below the phase separation temperature. It is also possible to perform the cooling stepwise, in a multiplicity of stages.

It is advantageous if the exit surface of the die and the surface of the cooling medium are spatially separated by a gap which is traversed by the shaped object before it comes into contact with the cooling medium. This gap can be an air gap, but it can also be filled with another gaseous atmosphere, and it can also be cooled or heated. Alternatively, the polymer solution can be brought directly into contact with the cooling medium after its exit from the die.

If a liquid cooling medium is used, this is preferably in a shaft or spinning tube through which the shaped object then passes for cooling purposes. The cooling medium and the shaped object are in general fed through the shaft or spinning tube in the same direction. The shaped object and the cooling medium can be fed at the same or different linear speeds through the spinning tube, whereby either the shaped object or the cooling medium may have the higher linear speed, depending on requirements. These variants of the method are described in, e.g., DE-A-28 33 493 and EP-A-133 882.

The inner filling used in extrusion of hollow filaments may be in gaseous or liquid form. If a liquid is used as inner filling, the liquid chosen should not substantially dissolve the polymer component in the shaped polymer solution below the critical demixing temperature of the polymer solution. To achieve an open-pored structure at the inner surface, inner fillings are used which are preferably solvents for the polyamide used, whereby the above-mentioned condition must be satisfied and/or the temperatures of the inner filling must be adjusted so that they lie below the demixing temperature of the polymer solution. In addition, the same liquids may be used as can be used for the cooling medium. The inner filling can be miscible with the solvent system. If the inner filling is gaseous, it can be air, a substance in vapour form, or preferably nitrogen or other inert gases.

In individual cases the pore structure of the polyamide membrane produced by the method of the invention can also be influenced by drawing the shaped polymer solution after its exit from the die, i.e., particularly in the air gap, the drawing being effected by establishing a difference between the exit speed of the polymer solution from the die and the speed of the first withdrawal device for the cooled shaped object.

After cooling and hardening of the polymer structure the solvent system is removed from the shaped object by, e.g., extraction. It is appropriate to use for this purpose extraction agents that do not dissolve the polymer or polymers but are nonetheless miscible with the solvent system. The extracted polyamide membrane is then generally dried at elevated temperatures to remove the extraction agent from the membrane. Before and/or after removal of at least a substantial portion of the solvent system, the membrane may be drawn in order particularly to modify the separation properties of the polyamide membrane in a specific manner.

Particularly after drawing the polyamide membrane, and often also after drying it, it is advantageous to fix the membrane to avoid shrinkage during use. Fixation can be performed by the methods commonly used for this purpose in membrane production.

In view of the multiple use of polyamide membranes in applications with aqueous media, the antioxidant agents used in the context of the present invention are preferably essentially insoluble in water, as will be discussed in detail below. For this reason, preferably aqueous media, and especially preferably water, are used in the method of the invention for extraction of the solvent system from the shaped object and therefore for exposure of the membrane structure. It is necessary for this purpose that the solvent system used be soluble in water. Water-soluble solvent systems are therefore preferably used in the method of the invention. It is also possible that individual components of the solvent system may not be miscible with water, provided that the solvent system as a whole is water-soluble.

In the case of solvent systems consisting of only a single solvent component, diglycerol is a preferred solvent for polyamide-6 and the copolymer polyamide-6,12. For solvent systems consisting of a mixture of a compound A and a compound B, diglycerol, glycerol, glycol, diglycol, glyceryl monoacetate, caprolactam or butyrolactone are preferably used as compound A and polyethylene glycols of various molecular weight are preferably used as compound B. Particularly good results are obtained with solvent systems consisting of a mixture of diglycerol and a polyethylene glycol, or with those containing a mixture of caprolactam and butyrolactone as compound A and a polyethylene glycol or glyceryl triacetate as compound B.

It is possible that for certain solvent systems consisting of a mixture of a compound A and a compound B, the stabiliser is soluble when the proportion of compound B is small. For example, it is possible, if caprolactam or butyrolactone is used as compound A, that if polyethylene glycol (PEG) 600 is used as compound B, any stabiliser used, such as Irganox 1098, is soluble in the solvent system even at the phase-separation temperature on account of the relatively small quantity of PEG 600 that can be added. A combination of this type does not, however, satisfy the conditions required by the method of the invention. However, by using PEG 200, which is of lower molecular weight and can be added in higher concentration, instead of PEG 600 a system can be devised that allows execution of the method in accordance with the invention.

It is also advantageous if the cooling medium consists of an aqueous medium and particularly advantageous when water is used as the cooling medium. By the use of aqueous cooling media and/or aqueous extraction agents, unwanted extraction of the stabiliser from the membrane during membrane production is at least to a large extent avoidable, so that the effectiveness of the stabiliser in improving the hydrolytic stability of the polyamide membrane is assured. It is thus possible that the antioxidant agent is retained at least almost quantitatively in the polyamide membrane.

To achieve the desired stabilisation effect in regard to hydrolytic resistance, the concentration of the antioxidant agent used as stabiliser in the method of the invention is preferably between 0.01 and 5% by weight relative to the polyamide and especially preferably between 0.05 and 2% by weight. Especially good results are achieved if the concentration of antioxidant agent lies between 0.2 and 1% by weight relative to the polyamide used. By an appropriate choice of conditions in the method of the invention, it can be ensured that the stabiliser used is present essentially quantitatively in the resulting polyamide membrane.

Various procedures are possible for incorporating the antioxidant agent into the solution consisting of polyamide and the solvent system. For example, a polyamide can be used that already contains an antioxidant agent, even if the choice of products available for this purpose is restricted, particularly if the requirement of insolubility in the solvent system at the phase separation temperature is taken into account. In a preferred embodiment of the method of the invention, a dry mixture (dry blend) is prepared of the polyamide, preferably in granulate form, and the chosen antioxidant agent, in which the antioxidant agent in powder form is coated on the polyamide granulate. This dry mixture is then melted in an extruder and intimately mixed. A homogeneous polyamide solution is then prepared from the melted polyamide, which now contains the antioxidant agent, and the solvent system, at temperatures above the demixing temperature.

The polyamides normally used for polyamide membranes are suitable for use as the polyamide constituting the membrane of the invention or as the polyamide used in the method of the invention. Thus polyamide homopolymers like polyamide-6, polyamide-6,6, polyamide-6,1 or polyamide-4,6, polyamide-11 or polyamide-12, and also polyamide copolymers such as those based on polyamide-6,12 can be used. The number average molecular weight of the polyamides used in the method of the invention lies preferably between 20000 and 60000 Daltons. Polyamides of this type show a relative solution viscosity (SV), as determined by the method indicated above, of between 2.5 and 5. Additionally, in the context of the present invention, polyamides of high thermal stability are preferred, which allow superheated steam sterilisation of the polyamide membrane formed from them at temperatures of at least 130° C. without any change in the membrane structure. For the present invention, polyamide-6 is especially preferred as the polymer constituting the membrane.

In regard to suitable antioxidant agents or antioxidants, it is possible to use the normal antioxidant agents that effectively stabilise polyamides, such as those described in, e.g., reviews in Ullman's *Encyklopädie der technischen Chemie*, 4$^{th}$ edition, volume 8, pp.19–45, Verlag Chemie GmbH, Weinheim 1974, or by G. W. Becker and D. Braun (editors) in *Kunststoff-Handbuch, 3. Thermoplastie, 4. Polyamide*, pp. 75–84, Carl Hanser Verlag, München-Wien 1998, provided that these antioxidants satisfy the conditions required by the invention. In the context of the present invention, either individual antioxidant agents or combinations of several antioxidant agents, even of different groups of substance, can be used as stabiliser.

The antioxidant agent contained in the polyamide membrane of the invention, or used in the method of the invention, is preferably a sterically hindered phenol. Particularly good results have been obtained with pentaerythritol tetrakis (3-(3,5-di-tert-butyl-4-hydroxyphenyl)propionate (CAS no. 6683-19-8, available as Ciba® Irganox® 1010), 3,3',3',5,5',5'-hexa-tert-butyl-α,α',α'-(mesitylene-2,4,6-triyl)tri-p-cresol (CAS no. 1709-70-2, available as Ciba® Irganox® 1330) or N,N'-hexane-1, 6-diylbis(3-(3,5-di-tert-butyl-4-hydroxyphenylpropionamide)) (CAS no. 23128-74-7, available as Ciba® Irganox® 1098) as antioxidant agents. The sterically hindered phenols can also be used in mixtures with one another or preferably together with phosphites.

The antioxidant agents contained in the membrane of the invention or used in the method of the invention are preferably essentially insoluble in water. The upper limit of solubility is considered to be ≦0.01 g/ 100 g of water at 20°

C. The appearance of the polyamide membrane, e.g., the colour, should not be affected by the antioxidant agent.

In the polyamide membrane of the invention or prepared by the method of the invention, the stabiliser is contained within the polymer matrix constituting the membrane structure. In contrast to the situation where a stabiliser is applied on the surface of a polyamide membrane after the membrane has been produced, the incorporation of the stabiliser into the polymer matrix results in long-term effectiveness of the stabiliser and therefore in the long-term hydrolytic stability required by the invention. For optimal effectiveness, the antioxidant agent is distributed as a fine dispersion, or dissolved, in the polyamide constituting the membrane.

For effective stabilisation of the polyamide membrane of the invention it is necessary that the quantity of stabiliser available be adequate to prevent degradation of the polymer. The polyamide membrane of the invention therefore contains preferably between 0.01 and 5%, and especially preferably between 0.05 and 2%, by weight of stabiliser relative to the polyamide. Particularly good results are obtained if the antioxidant agent is present in a concentration between 0.1 and 1% by weight relative to the polyamide used.

The method of the invention allows production of polyamide membranes of various pore structures across a cross-section of the membrane wall. Thus membranes can be produced with structures that are essentially isotropic across the wall, i.e., with a wall in which the size of the pores is essentially constant in all directions in space, but also membranes with non-isotropic, symmetric or asymmetric pore structure. The polyamide membranes of the invention or produced by the method of the invention can also have a layer with essentially denser pore structure, or a skin, on at least one of their sides. Preferably, at least the major part of the wall of the polyamide membranes of the invention, or produced by the method of the invention, between the surfaces of the membrane is in the form of a support layer with a microporous, sponge-like and open-pored structure and is free from macrovoids, i.e. free from pores frequently designated in the literature as finger pores or caverns.

The invention will be now described in more detail with reference to the following examples. In these examples the following methods have been used to characterise the properties of the polyamide membranes obtained:

Determination of Service Life in Air-Saturated Water at 80° C. (Degradation Test)

To determine the hydrolytic stability of polyamide membranes by measuring the service life in air-saturated water at 80° C., 300 g of water are placed in an appropriately dimensioned flask, fitted with a reflux condenser, which is heated to 80° C. In order to saturate the water with atmospheric oxygen, a fast stream of air is bubbled into the flask through a capillary introduced below the water surface.

In accordance with the scheduled sampling plan, an adequate number of membrane samples, each approx. 2–5 cm in length (or, in the case of flat membranes, strips of width approx. 1 cm) are immersed in the heated water. After various residence times, samples of approx. 0.5 g are taken from the flask, rinsed with distilled water and dried at approx. 50° C. in a vacuum drying cabinet. The samples are then tested for mechanical stability and relative viscosity.

Determination of Stability to Superheated Steam Sterilisation (Superheated Steam Sterilisation Test)

To test the hydrolytic stability of the polyamide membranes to superheated steam sterilisation, the polyamide membrane samples were subjected to multiple superheated steam treatment in a pressure vessel in the presence of atmospheric oxygen. For this purpose, membrane samples were suspended from a rack in a pressure vessel of approx. 200 ml capacity with a sealable inlet, in such a way that the samples did not touch the floor of the pressure vessel. The dimensions of the samples were chosen in a way that samples of approx. 0.5 g could be withdrawn for individual sampling in accordance with the sampling plan. The floor of the pressure vessel was covered with water.

After the samples were suspended within the pressure vessel and the inlet sealed, the pressure vessel was heated in a heating bath to the required sterilisation temperature (at least 125° C.) within 15–20 minutes and maintained at the sterilisation temperature for 1 hour. The container was then cooled to 80° C. within approx. 10 minutes and then opened to test the samples and to allow entry of cool air. Samples were then withdrawn in accordance with the sampling plan, e.g., for determination of the SV.

A new sterilisation cycle, consisting of a heating phase, a phase of maintenance at the sterilisation temperature and a cooling phase, was then begun. Importance was given to the introduction of fresh air before the start of each sterilisation cycle.

At the earliest detectable damage to the membrane samples, e.g., on application of even low mechanical stress, the test was ended and the number of sterilisation cycles up to the occurrence of the damage was determined as the number of sterilisation cycles withstood by the membrane without loss of mechanical stability or without the SV falling below 2.

Determination of Relative Solution Viscosity

In order to determine the relative solution viscosity, 250 mg of the polymer or membrane were dissolved in 25 ml of 90% formic acid at room temperature and with stirring, over a period of 1 hour. Using an Ubbelohde viscometer of type I-C (constant: 0.03188), the flow times in seconds of the polymer solution and of the solvent (formic acid) were determined at a measurement temperature of 25° C. The relative viscosity SV was then determined from the equation $$SV = \frac{\text{flow time of the polymer solution}}{\text{flow time of the solvent (90\% formic acid)}}$$

EXAMPLE 1

To prepare a membrane based on polyamide-6, a homogeneous solution of polyamide-6 of type AKULON F 136E (from DSM) with addition of the antioxidant agent Irganox® 1098 (from Ciba Specialty Chemicals) was prepared in a solvent system consisting of diglycerol and polyethylene glycol PEG 600 in the ratio 95:5. To keep degradation of the polyamide to a minimum, care was taken to work under the most protective conditions possible in regard to residence times and temperatures, and to use essentially anhydrous starting materials.

From AKULON F 136E granulate and 0.4% by weight, relative to the polyamide, of the antioxidant agent Irganox® 1098, a dry blend was first prepared by coating the Irganox® 1098 powder on the polymer granulate. The dry blend was melted in an extruder at approx. 240–250° C. and dosed by means of a gear pump into a low-volume mixer, heated to 190° C., with high shearing action. The solvent system, conditioned to 170° C., was simultaneously dosed into the mixer, the dosing settings for the polyamide melt and the solvent system being so chosen that a polymer solution containing approx. 22% by weight of polyamide was obtained.

The homogeneous polyamide solution exiting from the mixer was filtered, fed by means of a solution pump to a casting mould heated to approx. 200° C., and then spread out, with a film thickness of approx. 140 µm, to a shaped object on a casting roller conditioned to approx. 75° C. After being passed through an air section, the shaped object was immersed in a cooling bath containing warm water at 75° C. to obtain the final membrane structure. The polyamide flat membrane so formed was washed with deionised water at 90° C., slightly drawn, and then dried on a drum dryer and fixed.

The membrane obtained had a microporous, sponge-like pore structure, was spontaneously wettable with water, and had a thickness of approx. 130 µm and a maximum pore diameter $PD_{max}$ of 0.45 µm as determined by bubble point measurement using isopropanol. The maximum pore diameter $PD_{max}$ was determined by the bubble point method as described in EP-B 0 361 085. In the degradation test, no loss of mechanical stability of the membrane could be detected after a treatment period of approx. 500 hours in water at 80° C. into which air was bubbled; the relative solution viscosity was then approx. 2.8. In the superheated steam sterilisation test (125° C.) the membrane showed adequate mechanical stability even after 15 sterilisation cycles; the relative solution viscosity SV was then 2.49.

To determine the stabiliser content in the polyamide membrane for this example, a membrane sample was extracted with methanol in a Soxhlet extractor at the boiling point over a period of 8 hours. From the Irganox® 1098 content of the extract as determined by UV-visible spectroscopy, the concentration of Irganox® 1098 in the membrane was calculated to be around 0.4% by weight.

COMPARATIVE EXAMPLE 1

The procedure was as in example 1, except that no stabiliser was added to the polyamide-6 (AKULON F 136E) used.

The membrane obtained had a thickness of 140 µm and a maximum pore diameter $PD_{max}$ of 0.48 µm as determined by bubble point measurement with isopropanol. In the degradation test, the non-stabilised membrane disintegrated after a treatment period of approx. 56 hours in water at 80° C. into which air was bubbled; the relative solution viscosity SV was <2. In the superheated steam sterilisation test (125° C.), the non-stabilised membrane was brittle after only 3 sterilisation cycles (SV<2).

EXAMPLE 2

The procedure was as in example 1, the starting material being a polyamide copolymer of type Grilon CR 9 HV (polyamide-6/12 from Ems-Chemie) to which 0.4% by weight of the antioxidant agent Irganox® 1098 was added. The solvent system used was a mixture of diglycerol and polyethylene glycol PEG 400 in the ratio 70:30.

The polymer component was melted at approx. 230–235° C. and together with the solvent system, conditioned to 170° C., was processed into a clear and homogeneous solution in the mixer, which was heated to approx. 195° C. The polymer concentration of the solution was adjusted to approx. 29% by weight. The solution was filtered, fed to a casting mould, which was conditioned to 90° C., by means of a solution pump and spread out to a film, approx. 140 µm thick, on a casting roller conditioned to approx. 50° C. Cooling and the associated formation of the flat membrane took place in a water cooling bath conditioned to approx. 50° C. After extraction of the solvent system by deionised water at approx. 90° C., the flat membrane was slightly drawn, dried on a drum dryer and then fixed.

The microporous flat membrane obtained had a thickness of approx. 140 µm and a maximum pore size $PD_{max}$ of 0.76 µm. After a treatment period of 200 hours in the degradation test, no visible defect could be detected on the membrane, as was consistent with a relative solution viscosity SV of >2.

COMPARATIVE EXAMPLE 2

The procedure was as for example 2, except that no stabiliser was added to the polyamide-6/12 (Grilon CR 9 HV) used.

The membrane obtained corresponded in its characteristics to that produced in example 2. In the degradation test, the non-stabilised membrane showed defects after a treatment period of approx. 68 hours in water at 80° C. through which air was bubbled; the relative solution viscosity SV was then <2.

EXAMPLE 3

Following the method described in example 1, AKULON F 136E granulate and 0.4% by weight, relative to the polyamide, of the antioxidant agent Irganox® 1098 were used to initially prepare a dry blend by coating the Irganox® 1098 powder on the polymer granulate. The dry blend was melted in an extruder at approx. 240° C. and dosed by means of a gear pump into a low-volume mixer, heated to 170° C., with high shearing action. The solvent system, conditioned to 135° C., was simultaneously dosed into this mixer, the dosing settings for the polyamide melt and the solvent system being so chosen that a polymer solution containing approx. 18% by weight of polyamide resulted. The solvent system used in this case was a mixture of glycerol and polyethylene glycol PES 600 in the ratio 85:15, to which was added 0.2% by weight, relative to the solvent system, of the thickening agent Carbopol 940 (from Goodrich) to facilitate shaping of the subsequently formed hollow-fibre membrane.

The homogeneous polyamide solution issuing from the mixer was filtered and fed by means of a solution pump to a hollow-fibre die conditioned to approx. 180° C. (diameter of die bore: 925 µm; external/internal diameter of die needle: 544 µm/330 µm). A liquid inner filling of glycerol and PEG 600 in a 1:1 ratio was used for lumen formation. The shaped solution was passed through an air gap and then cooled in a cooling bath of water conditioned to 50° C., whereby the hollow-fibre membrane was formed. This was extracted with hot water and then dried. The resulting hollow-fibre membrane had a microporous structure and a maximum pore diameter $PD_{max}$ of 0.87 µm.

In the degradation test, the hollow-fibre membrane obtained was still usable after a treatment period of approx. 200 hours, i.e., no loss of mechanical stability could be detected after this period. In the superheated steam sterilisation test (125° C.) the membrane was still intact (SV=2.49) even after 15 sterilisation cycles.

COMPARATIVE EXAMPLE 3

The method of example 3 was followed, except that no stabiliser was added to the polyamide-6 (AKULON F 136E) used.

The non-stabilised polyamide hollow-fibre membrane obtained disintegrated in the degradation test after a treatment period of approx. 70 hours. In the superheated steam sterilisation test (125° C.) the non-stabilised membrane was brittle (SV<2) after only 3–4 cycles.

EXAMPLE 4

A polyamide hollow-fibre membrane was prepared by the method described for example 3. AKULON M258 (from DSM) was used as polyamide-6; to this was added as stabiliser 0.5% by weight of the antioxidant agent Irganox® 1010 (from Ciba Specialty Chemicals). The solvent system used was a mixture of glycerol and ethylene glycol in the ratio 80:20 with the addition of 0.2% by weight of the thickening agent Carbopol 940 (from Goodrich). A mixture of glycerol and PEG 300 in the ratio 1:1 served as lumen filler. The temperature of the water used as cooling medium was 40° C.; the draw-off speed was 22 m/min.

The hollow-fibre membrane obtained had a $PD_{max}$ of 0.57 µm. A relative viscosity SV of 4.15 was determined for the untreated membrane.

In the degradation test the hollow-fibre membrane of this example showed an SV of 4.02 even after 250 hours and was mechanically stable. In the superheated steam sterilisation test the membrane withstood 15 cycles without loss of mechanical stability; the SV was 2.49 after 15 cycles.

COMPARATIVE EXAMPLE 4

The method followed was that of example 4, except that no stabiliser was added to the polyamide-6 (AKULON M258) used.

The non-stabilised polyamide hollow-fibre membrane obtained, which showed an SV of approx. 4.05 before testing, disintegrated in the degradation test after a treatment period of approx. 33 hours (SV<2). In the superheated steam sterilisation test (125° C.) the non-stabilised membrane disintegrated after only 3 sterilisation cycles, at which time the SV was 1.63.

COMPARATIVE EXAMPLE 5

A non-stabilised membrane was prepared as in comparative example 1, except that Ultramid B5 (from BASF) was used as polyamide-6. With a number average molecular weight ($M_N$) of approx. 50,000, this had a higher molecular weight than the AKULON F 136E used in example 1 and comparative example 1.

The membrane obtained had a thickness of approx. 140 µm and a maximum pore diameter $PD_{max}$ of 0.67 µm as determined by bubble point measurement with ispropanol. In the degradation test, the non-stabilised membrane, despite its high initial molecular weight, was fully disintegrated after a treatment period of approx. 44 hours in water at 80° C. through which air was bubbled; the relative solution viscosity SV was <2. In the superheated steam sterilisation test (125° C.) the non-stabilised membrane was brittle after only 3 sterilisation cycles (SV<2).

The invention claimed is:

1. A method for production of a hydrolytically stable polyamide membrane, the method comprising:

a) preparing a homogeneous solution containing 10–90% by weight of an aliphatic polyamide in 90–10% by weight of a solvent system, wherein the solution of polyamide and solvent system has a critical demixing temperature and a solidification temperature, and shows a miscibility gap below the demixing temperature in the liquid state, and wherein the solution contains an antioxidant agent as a stabilizer for the polyamide, the antioxidant agent being essentially insoluble in the solvent system at or below the demixing temperature;

b) shaping the solution into a shaped object in a die at a die temperature, the die temperature being above the critical demixing temperature;

c) cooling the shaped object with a cooling medium conditioned to a cooling temperature below the solidification temperature, at such a cooling rate that a thermodynamic non-equilibrium liquid-liquid phase separation into a polymer-rich phase and a polymer-poor phase occurs, followed by solidification of the polymer-rich phase to a membrane structure when the temperature falls below the solidification temperature; and d) removing the solvent system from the shaped object, wherein the antioxidant is a sterically hindered phenol selected from the group consisting of pentaerythritol tetrakis(3-(3,5-di-tert-butyl-4-hydroxyphenyl)propionate) (CAS no. 6683-19-8), 3,3',3',5,5',5'-hexa-tert-butyl-α,α',α'-(mesitylene-2,4,6-triyl)tri-p-cresol (CAS no. 1709-70-2) and N,N'-hexane-1,6-diylbis(3-(3,5-di-tert-butyl-4-hydroxyphenylpropionamide)) (CAS no. 23128-74-7).

2. The method according to claim 1, wherein a mixture of a compound A and a compound B is used as the solvent system; wherein compound A is a solvent for the polyamide, and wherein compound B is selected from the group consisting of a non-solvent for the polyamide, a solvent that dissolves the polyamide but dissolves the polyamide at a temperature that is at least 50° C. higher than a temperature at which compound A dissolves the polyamide, and a swelling agent for the polyamide.

3. The method according to claim 1, wherein the solvent system is water soluble.

4. The method according to claim 1, wherein water is used as the cooling medium.

5. The method according to claim 1, wherein the polyamide has an average molecular weight between 20000 and 60000 Daltons.

6. The method according to claim 1, wherein the polyamide permits sup erheated steam sterilization of the membrane structure at temperatures of at least 130° C. without any change in the membrane structure.

7. The method according to claim 1, wherein the polyamide comprises polyamide-6.

8. The method according to claim 1, wherein the stabilizer is first mixed with the polymer in the form of a dry blend and melted along with the polymer, before the homogeneous solution with the solvent system is prepared.

9. The method according to claim 1, wherein a concentration of the antioxidant agent is between 0.01 and 5% by weight relative to the polyamide.

10. The method according to claim 9, wherein the concentration of the antioxidant agent is between 0.05 and 2% by weight relative to the polyamide.

* * * * *

UNITED STATES PATENT AND TRADEMARK OFFICE
CERTIFICATE OF CORRECTION

PATENT NO. : 7,201,860 B2
APPLICATION NO. : 10/297179
DATED : April 10, 2007
INVENTOR(S) : Friedbert Wechs It is certified that error appears in the above-identified patent and that said Letters Patent is hereby corrected as shown below:

Title Page; item (57)
In line 6 of the Abstract, "comprising preferably" should read --which may include--; and in line 17 of the Abstract, "characterised in that it contains" should read --that contains--.

In claim 6, column 14, line 50, "sup erheated" should read --superheated--.

Signed and Sealed this

Seventeenth Day of July, 2007

JON W. DUDAS
*Director of the United States Patent and Trademark Office*